(12) United States Patent
Ota et al.

(10) Patent No.: US 8,347,766 B2
(45) Date of Patent: Jan. 8, 2013

(54) AUTOMATIC SCREW TIGHTENING APPARATUS

(75) Inventors: Yoshitake Ota, Iwate (JP); Hiroshi Takahashi, Iwate (JP)

(73) Assignee: Ohtake Root Kogyo Co., Ltd., Iwate (JP)

( * ) Notice: Subject to any disclaimer, the term of this patent is extended or adjusted under 35 U.S.C. 154(b) by 218 days.

(21) Appl. No.: 12/985,626

(22) Filed: Jan. 6, 2011

(65) Prior Publication Data

US 2011/0209589 A1  Sep. 1, 2011

(30) Foreign Application Priority Data

Feb. 12, 2010  (JP) .................................. 2010-029559

(51) Int. Cl.
*B25B 23/04* (2006.01)
(52) U.S. Cl. ........................................ 81/430; 81/57.37
(58) Field of Classification Search .................... 81/430, 81/431, 57.37; 227/112
See application file for complete search history.

(56) References Cited

U.S. PATENT DOCUMENTS

| 3,583,451 | A | * | 6/1971 | Dixon et al. | 81/57.37 |
| 4,463,889 | A | * | 8/1984 | Sartran | 227/112 |
| 5,186,084 | A | * | 2/1993 | Totsu | 81/431 |
| 6,550,359 | B1 | * | 4/2003 | Graham | 81/431 |
| 7,178,432 | B1 | * | 2/2007 | Han et al. | 81/430 |

FOREIGN PATENT DOCUMENTS

| JP | 09-058847 | 3/1997 |
| JP | 2001-287827 | 10/2001 |

* cited by examiner

*Primary Examiner* — David B Thomas
(74) *Attorney, Agent, or Firm* — Dilworth & Barrese, LLP.

(57) ABSTRACT

An automatic screw tightening apparatus has a screw discharging unit for transferring a screw to a transfer tube, an engaging unit for engaging the head part of the screw transferred from the transfer tube with a front end of a driver, and an openable and closable sealing cover for preventing air from leaking and which is opened and exposes the screw for tightening.

4 Claims, 15 Drawing Sheets

AUTOMATIC SCREW TIGHTENING APPARATUS

BACKGROUND OF THE INVENTION

1. Technical Field

The present invention relates to an automatic screw tightening apparatus, and in particular, to an automatic screw tightening apparatus that transfers a screw from a screw aligning/supplying apparatus to a screw tightening driver unit by, for example, a transfer tube, and tightens the screw against a screwed subject.

2. Related Art

Well-known general screw tightening apparatuses adapt, as a method of supplying a screw to a fore end of a driver bit, (1) a method of directly picking a screw up from a screw aligning/supplying apparatus with a driver, (2) a method in which a screw transfer tube is brought into close contact with a fore end of a driver bit and a screw is directly sucked to a driver, and (3) a method of transferring a screw from a screw aligning/supplying apparatus to a driver unit by a pressure of compressed air.

The above-mentioned first screw supplying method is, for example, a method of aligning screws in one line by a screw aligning/supplying apparatus, moving a driver to the upper side of a screw positioned at a predetermined location, lowering the driver to the location of the screw, and drawing the screw by a screw sucking device installed in the driver such that the screw is engaged with the bit of the driver, as disclosed in Japanese Patent Laid Open Publication No. Hei9-58847.

The above-mentioned second screw supplying method is a method that brings a screw transfer tube d into direct contact with a fore-end part of a mouthpiece f provided outside of a driver bit e, directly draws a screw b into a mouthpiece f by sucking the screw b aligned by a screw aligning/supplying apparatus (not shown) by a screw sucking device installed in a driver c, moves the driver bit e, and tightens the screw b against a screwed subject part, as shown in FIG. 16.

The above-mentioned third screw supplying method is, for example, a method of supplying a screw b1 aligned by a screw aligning/supplying apparatus from a compressed-air supplying unit of the screw aligning/supplying apparatus to a fore-end part c1 of a driver c through a screw transfer unit d such as a tube by a pressure of compressed air, as shown in (a) and (b) of FIG. 17.

In this case, while the screw b1 is tightened against a screwed subject part by a driver bit e, the next screw b2 is supplied to the driver c as shown in (a) of FIG. 17. Further, when tightening of the previous screw b1 is completed and lifting of the driver bit e is completed, the next screw b2 moves to the fore-end part c1 of the driver c, and when the driver bit 3 is lowered down again, the screw b2 is engaged with the driver bit e ((b) of FIG. 17). Here, the fore-end part c1 of the driver c is configured to be openable and closable so that when the screw b2 is tightened to a screwed subject part g, the fore-end part c1 is opened, and when the next screw b2 is supplied after the tightening of the screw is completed, the fore-end part c1 is closed, whereby screws b are automatically and consecutively supplied.

However, in the above-mentioned first and second screw supplying methods, since the driver c should move to a predetermined position of the screw aligning/supplying apparatus whenever tightening of each screw b against a screwed subject part is completed, there are disadvantages including the followings: a time interval from a time point when tightening of one screw b is completed to a time point when tightening of the next screw starts becomes long; a lot of time is taken to tighten all screws b against screwed subject parts; and it is required to closely position the screw aligning/supplying apparatus and the driver c and to accurately determine the distance between the screw aligning/supplying apparatus and the driver c.

Further, in the second screw supplying method, since a screw b is directly sucked from the screw aligning/supplying apparatus by the screw sucking device installed in the driver c, the structure of the screw aligning/supplying apparatus and the fore-end part of the driver c can be simplified. However, since a screw b is directly sucked into the mouthpiece f, while one previous screw b is tightened, the next screw b cannot be supplied. Therefore, there is a disadvantage in which an amount of time required to tighten all screws to screwed subject parts becomes large, similar to the first screw supplying method.

Furthermore, in general, whether a screw b has reached the inside of the mouthpiece f is detected by a pressure detector of a screw sucking device. However, there are disadvantages in which accuracy of detecting a variation in an air pressure is low and accuracy of detecting that a screw b has reached is low.

In the third screw supplying method, unlike the first and second screw supplying methods, it is unnecessary to move the driver c whenever a screw b is tightened to a screwed subject part, and while a screw b is tightened, the next screw b1 is prepared. Therefore, an amount of time required to tighten all screws to screwed subject parts is remarkably reduced as compared to the first and second screw supplying methods.

However, in a case of the third screw supplying method, when a screw b once supplied to the driver c moves to and is engaged with a fore-end of the driver bit e, the screw is transferred with the tip of the thread part of the screw b being in the lead and with the head part of the screw at the tail end. Therefore, there is a disadvantage in which the position of the screw b becomes unstable. In particular, when the length of the screw b is short, the direction of the screw b may be reversed or get stuck on its way. Therefore, there is a disadvantage in which it is difficult to stably supply screws b to the driver bit e.

Moreover, since the screw b is transferred with the tip of the thread part of the screw b being in the lead, there are disadvantages in which the screw may damage the inner wall of a transfer tube or get stuck in the transfer tube.

SUMMARY OF THE INVENTION

The present invention has been made considering the above-mentioned problems and is to provide a screw tightening apparatus which is capable of reducing a total amount of screw tightening time, reducing damage of an inner wall of a transfer tube, preventing a screw from getting stuck in the transfer tube, stabilizing the position of a screw, preventing a direction of a screw from being reversed, stably supplying a screw to a driver (bit), and improving reliability.

In order to achieve the above-mentioned object, according to an embodiment of the invention, there is provided an automatic screw tightening apparatus that transfers a screw from a screw supplying mechanism to a screw tightening mechanism by a screw transfer mechanism using air suction of the screw tightening mechanism and tightens the screw to a predetermined screwed subject part, in which a screw discharging unit for transferring the screw to a transfer tube with the head part of the screw being in the lead is provided in the screw supplying mechanism, an engaging unit for engaging the head part of the screw transferred from the transfer tube with a fore end of a driver is provided in a fore-end part of the screw tightening mechanism, and an openable and closable sealing cover for preventing air from leaking is provided in the fore-end part of the screw tightening mechanism, and is opened and exposes the screw engaged with the fore end of the driver when the fore end of the driver moves straight, whereby screw tightening is performed.

Further, a cylindrical screw holder covering the driver and the screw may be provided, push the sealing cover to open the sealing cover when the driver advances while maintaining the engagement state of the screw, and retreat when the screw is pressed against the screwed subject part.

The screw discharging unit of the screw supplying mechanism may be operated by a command of a driver operating switch.

According to the embodiment of the present invention, since screws S are automatically and sequentially supplied to the fore end of the driver, time until when screw tightening is completed becomes very short, it is unnecessary to move the screw tightening (apparatus) mechanism and the driver (bit) whenever a screw is tightened against a screwed subject part, and screw tightening operations can be consecutively performed in the vicinity of the screwed subject part, and the operations are simplified.

Further, since the screw transfer mechanism using air suction from the screw supplying mechanism side transfers a screw with a head part being in the lead, the screw is less likely to damage the inner wall of the transfer tube and does not get stuck in the transfer tube, and it is possible to stabilize the position of the screw, to firmly engage the screw with the driver bit, to stably supplying the screw to a driver, and to improve reliability.

Furthermore, it is possible to prevent the screw from falling off the driver and to reliably perform opening and closing of the sealing cover.

Moreover, since it is possible to transfer the next screw to be used to the fore-end part of the bit of the screw tightening mechanism and keep the next screw, it is possible to reduce time of consecutive operations.

DESCRIPTION OF EXEMPLARY EMBODIMENT

Embodiments of the present invention automatically and consecutively tighten screws by transferring screws from a screw supplying mechanism, having a discharge part aligning and discharging screws, to a screw tightening mechanism by a transfer tube such as a vinyl tube with the head parts of the screws being in the lead, engaging the head parts of the transferred screws with a fore end of a bit of a driver of the screw tightening mechanism, and tightening the screws to predetermined screwed subject parts.

First Embodiment

Hereinafter, an automatic screw tightening apparatus according to an embodiment of the invention will be described in detail with reference to the accompanying drawings.

[Screw Supplying Mechanism 1]

Figure 1:
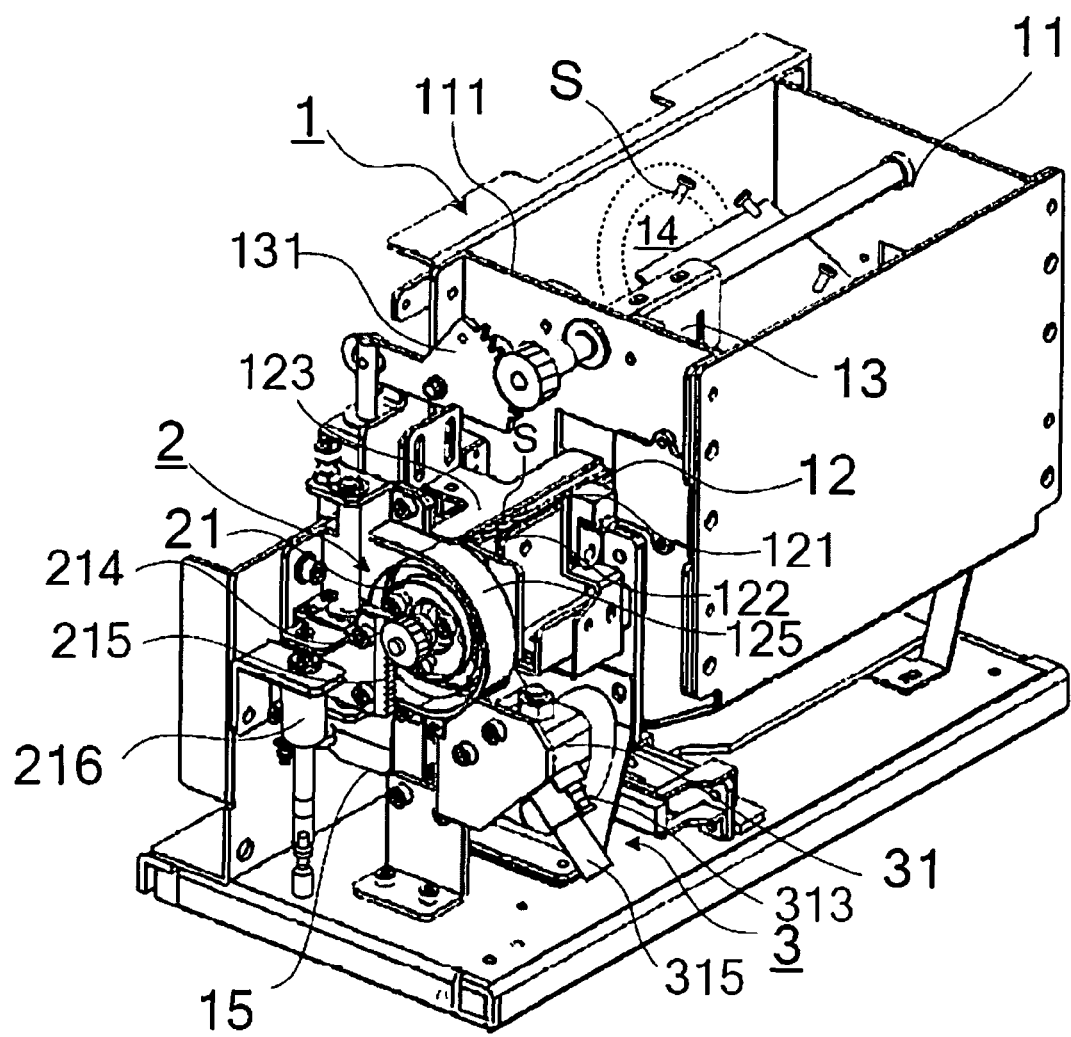
FIG. 1 is an appearance perspective view of a screw supplying mechanism according to an embodiment of the present invention.
Figure 2:
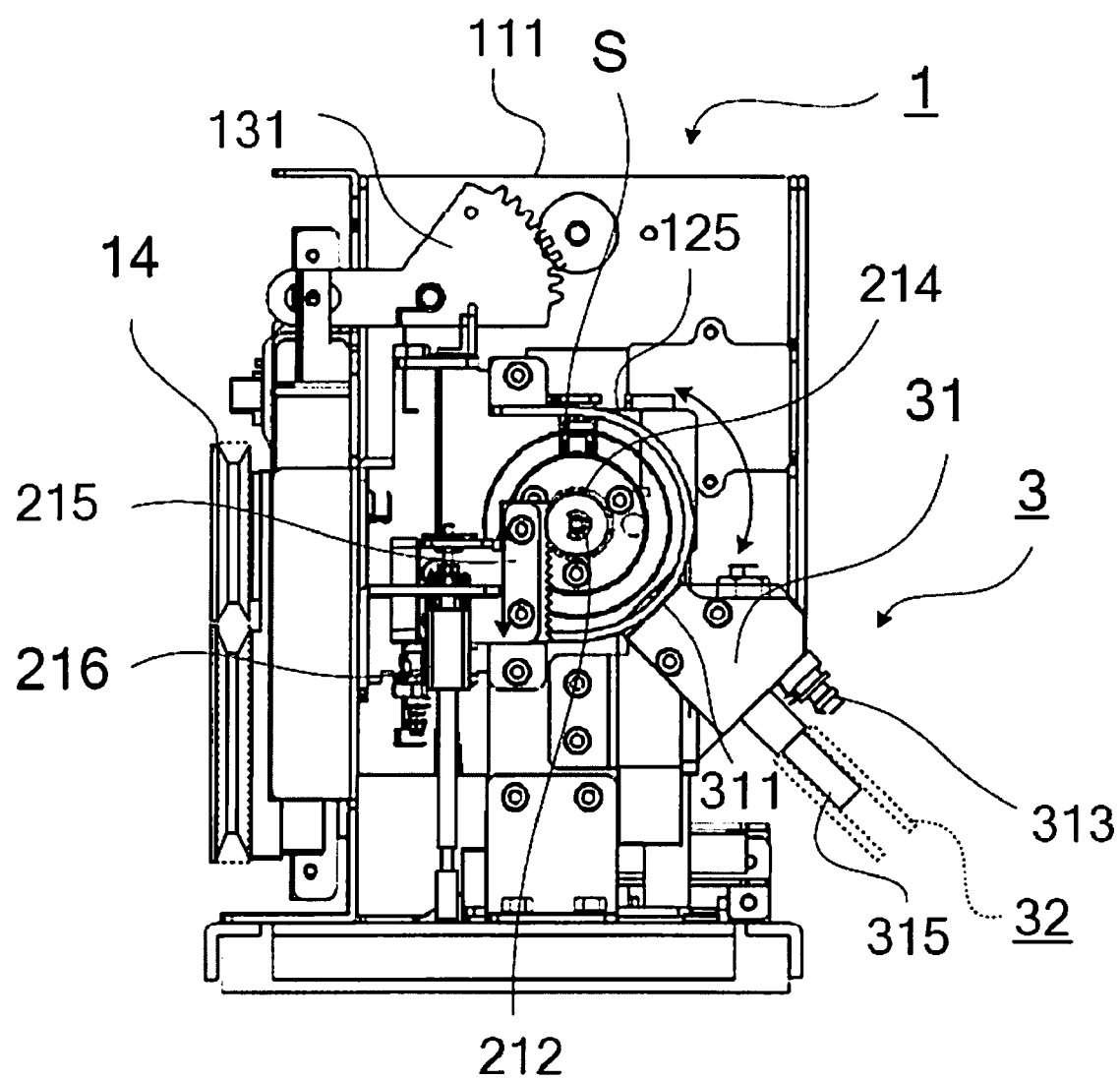
FIG. 2 is a front view of the screw supplying mechanism of FIG. 1.

FIG. 1 is a perspective view of a screw supplying mechanism 1 with an outer frame removed, and FIG. 2 is a front view of the screw supplying mechanism 1. As shown in FIG. 1, screws S are stored in a screw storing unit 11 of the screw supplying mechanism 1, and the stored screws S are aligned and sequentially transferred forward by a guide rail 12 protruding from a front casing board 111 of the screw storing unit 11 and an alignment screw guide 122 installed in the fore-end part 121 of the guide rail 12.

A mechanism to the screw aligning mechanism may be a well-known mechanism. In this embodiment, the guide rail 12 is vibrated such that the screws S in the screw storing unit 11 advance forward, spare screws S on the guide rail 12 are dropped by an oscillation brush 13, and the dropped screws S are re-induced to the guide rail 12 by a screw scooping unit 14 such as a turning magnetic positioned on a side surface. A brush turning mechanism 131 turns the oscillation brush 13 from side to side. The brush turning mechanism 131 and the screw scooping unit 14 are driven by a transmission mechanism of a drive motor 15 or a pulley or a ring disposed on the front surface of the screw storing unit 11.

[Screw Discharging Unit 2]

Figure 3:
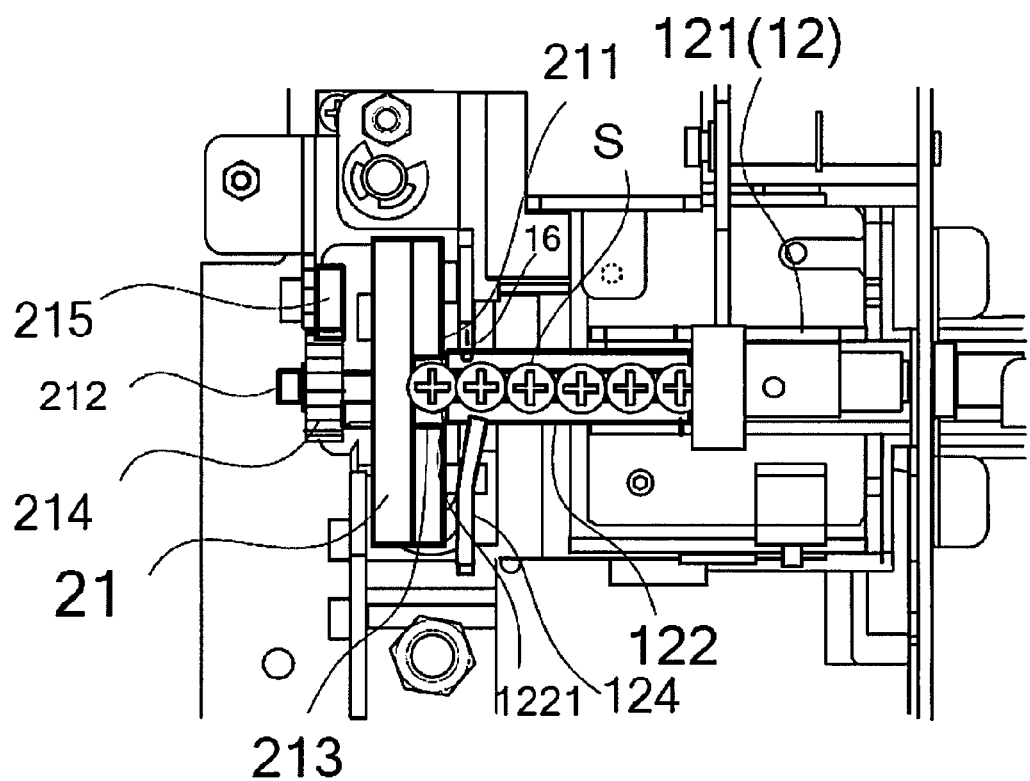
FIG. 3 is a plan view of a discharge unit of FIG. 1 as seen from the upper side of a screw transfer mechanism.
Figure 4:
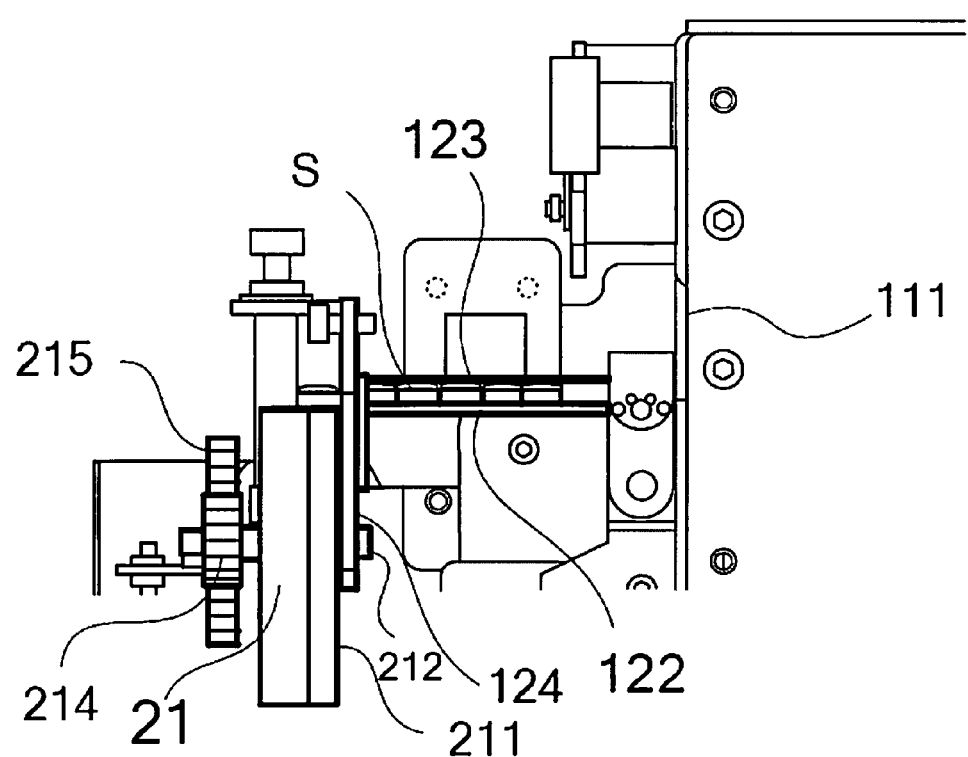
FIG. 4 is a right side view of a part of FIG. 3.

Further, as shown in FIGS. 3 and 4, a screw aligning cover 123 is provided on the alignment screw guide 122, and a screw discharging unit 2 is disposed to induce the screws S such that, in the next process, the screw head part S1 of each of the screws S is located in the lead of a progress direction in a movement tube 31 of a screw transfer mechanism 3. The screw discharging unit 2 is disposed to be in contact with a guide fore-end surface 1221 of the alignment screw guide 122 as shown in a top view of FIG. 3 and a left lateral view of FIG. 4.

Figure 5:
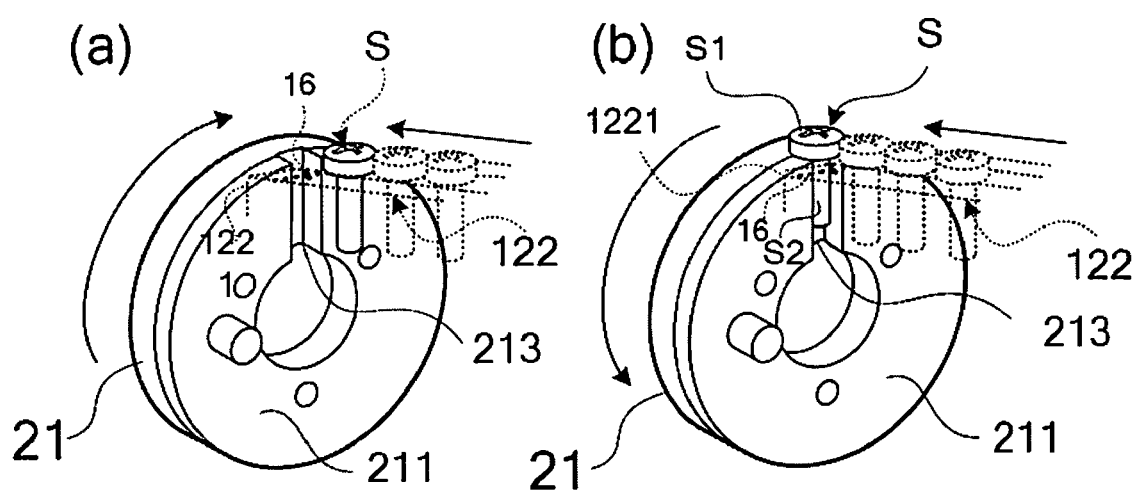
FIGS. 5(a) and 5(b) is an enlarged perspective view illustrating an operation of a screw bringing disk of FIG. 4.

A main component of the screw discharging unit 2 is a screw bringing disk 21 (see FIG. 5) which takes out the screws S on the alignment screw guide 122 one by one by turning clockwise and counterclockwise. The screw bringing disk 21 turns clockwise and counterclockwise around a rotation shaft 212. A rotation surface 211 of the screw bringing disk 21 is provided at a right angle to the screw movement direction of the alignment screw guide 122 of the screw supplying mechanism 1, and a screw receiving groove 213 is provided in the rotation surface 211 of the screw bringing disk 21. The screw receiving groove 213 is a groove which is congruent with the position of the screws S supplied from the alignment screw guide 122 and has a width slightly greater than the diameter of the thread parts S2 of the screws S.

Further, on the opposite side of the screw bringing disk 21 to the side where the alignment screw guide 122 of the screw bringing disk 21 is disposed, a drive gear 214 is provided. The gear 214 is engaged with a rack 215 moving up and down. The vertical movement of the rack 215 is hydraulically controlled by a drive cylinder 216 according to a control command device (not shown), thereby turning the screw bringing disk 21 clockwise and counterclockwise.

[Screw Transfer Mechanism 3]

Next, the structure and operation of the screw bringing disk 21 will be described with reference to (a) to (d) of FIG. 6.

Figure 6:
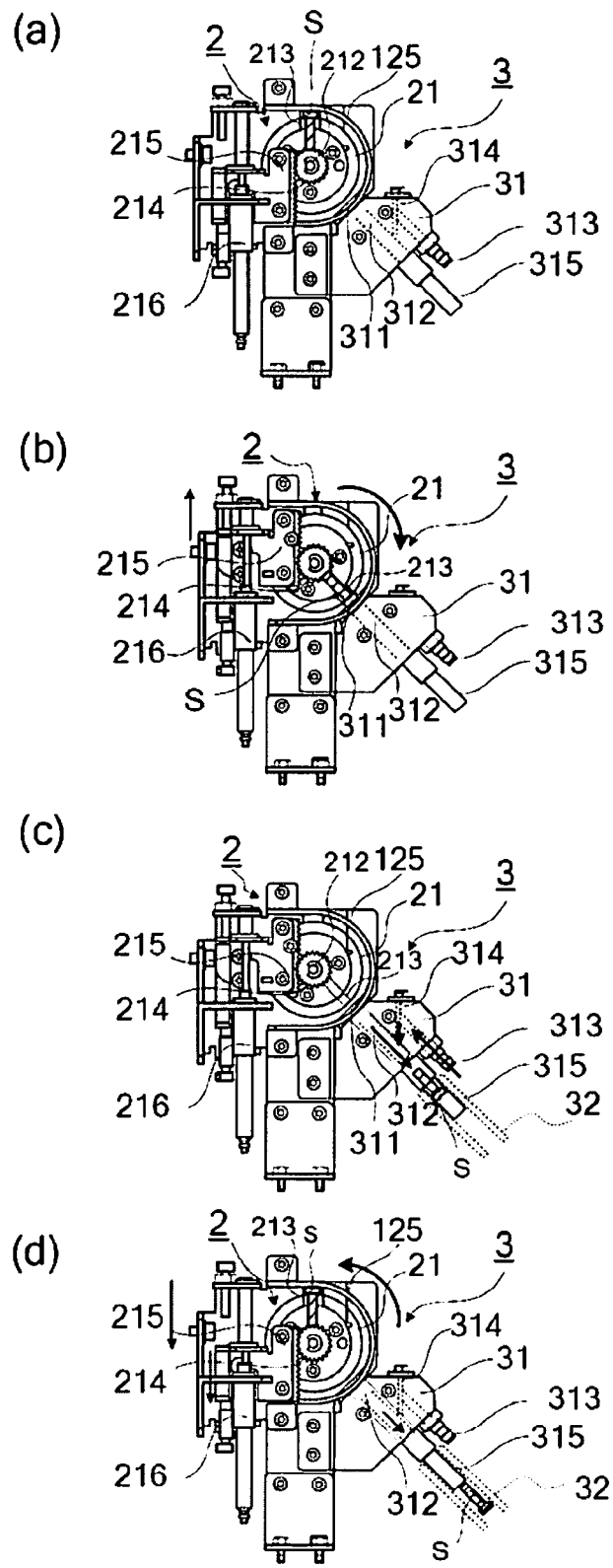
FIG. 6(a)-6(d) is an illustrative view illustrating an operation of the screw discharging unit and the screw tightening mechanism.

As shown in (a) of FIG. 6, in order to prevent a screw form dropping when the screw is fitted into the screw receiving groove 213 of the screw bringing disk 21 and the screw bringing disk 21 turns clockwise in the drawing, a side screw guide 124 (see FIG. 3) is provided on the screw supplying mechanism 1 side and a screw top guide 125 is provided along the outer circumference of the screw bringing disk 21 on the screw head part side. In (a) of FIG. 6, the screw bringing disk 21 stands still in a state in which a screw is fitted into the screw bringing disk 21.

Next, as shown in (b) of FIG. 6, according to a turn command of the control command device (not shown), the drive cylinder 216 is extended, the rack 215 moves upward, and the gear 214 and the screw bringing disk 21 turns clockwise about 135° and then stop.

Here, a chute block 31 of a screw transfer mechanism 3 is fixed to the screw supplying mechanism 1 to be close to the screw discharging unit 2, and a transfer tube 32 connected to a screw tightening mechanism 4 is connected to a tube connection part 315 of the chute block 31.

In the stop state of the screw bringing disk 21 shown in (b) of FIG. 6, the screw S is at the position of a movement inlet 311 of the transfer mechanism 3 with a screw head part S1 tilted downward. Subsequently, as shown in (c) of FIG. 6, the screw S1 moves to a screw guide path 312 by the weight of the screw.

Next, compressed air is supplied to a compressed-air inlet 313 provided in the chute block 31 and is discharged from the a nozzle 314 positioned in the upstream of the screw S in the screw guide path 312, and at the same time, a suction is imposed on the transfer tube 32 according to the control command device (not shown), whereby the screw S induced in the screw guide path 312 with the screw head part S1 being in the lead is sucked and transferred to the screw tightening mechanism 4. Further, the compressed air supplied to the compressed-air inlet 313 simplifies the structure while improving operation efficiency by using remaining gas of a solenoid valve (not shown) when the drive cylinder 216 is retracted.

Since the air transfer mechanism using compressed air is a secondary mechanism in the embodiment of the present invention, it may be applied if necessary. As will be described below with reference to FIG. 9, the main is absolutely a screw transfer mechanism by air suction of the screw tightening mechanism, and screw transfer is performed by a suction effect of a suction inlet 602 passing through a gap between the driver bit 61 and a screw holder 66 in a fore-end part 612 of a driver bit 61. Therefore, in cases where screw transfer using air is sufficiently possible, for example, a case where the transfer tube 32 is short, as long as the transfer tube 32 is opened to the outside, it is unnecessary to supply compressed air.

If the transfer of the screw S is completed, the screw discharging unit 2 should take out the next screw S. To this end, the screw bringing disk 21 turns counterclockwise as shown in (d) of FIG. 6 so as to return to the state as shown in (a) of FIG. 6, and stands by in a state in which the first screw from the alignment screw guide 122 is fitted in the screw receiving groove 213 of the screw bringing disk 21.

Then, the screw S moves into the transfer tube 32 with the screw head part S1 being in the lead, and is fed to the screw tightening mechanism 4. Further, a predetermined length of transparent tube may be used as the transfer tube 32. The transparent tube is formed of synthetic resin which has flexibility and does not cause a variation in an inner diameter and has an inner wall to which a material to prevent screws from getting stuck in the transfer tube is applied. Needless to say, the inner diameter may vary according to used screws S.

[Screw Tightening Mechanism 4]

Figure 7:
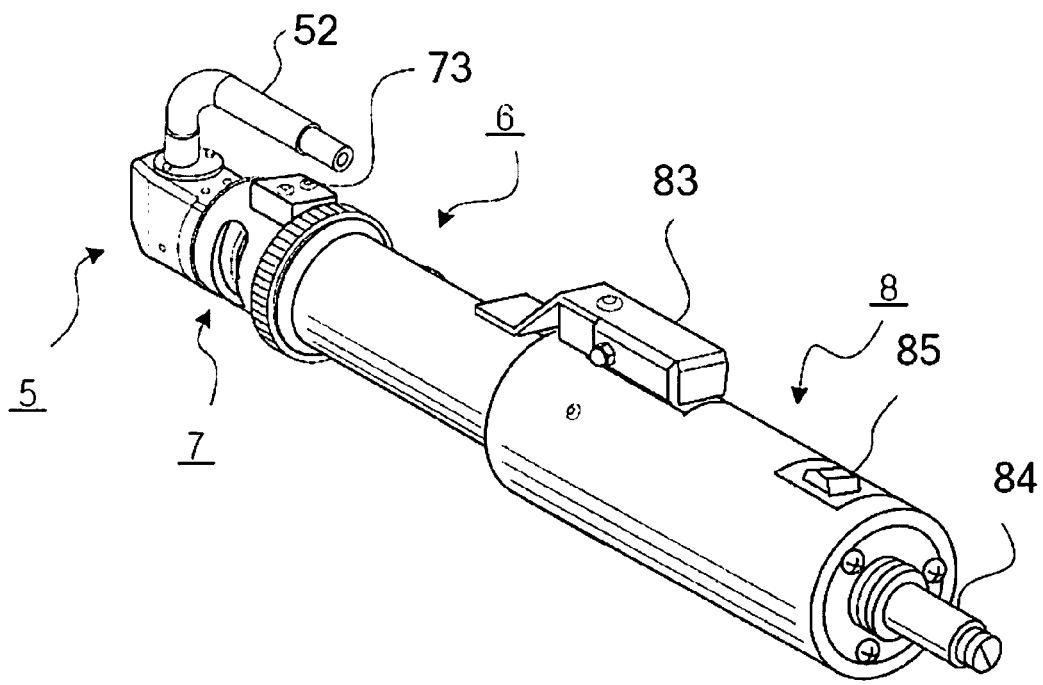
FIG. 7 is an appearance perspective view of a screw tightening mechanism according to an embodiment of the present invention.

The whole screw tightening mechanism 4 is shown in FIG. 7. In the screw tightening mechanism 4, a fore-end receiver unit 5, a cylinder unit 6, a torque regulation unit 7, and a back-end motor drive unit 8 having a handle are configured in this order, as shown in the exploded perspective view of FIG. 8 and the cross-sectional view of FIG. 9.

[Receiver unit 5]

Figure 10:
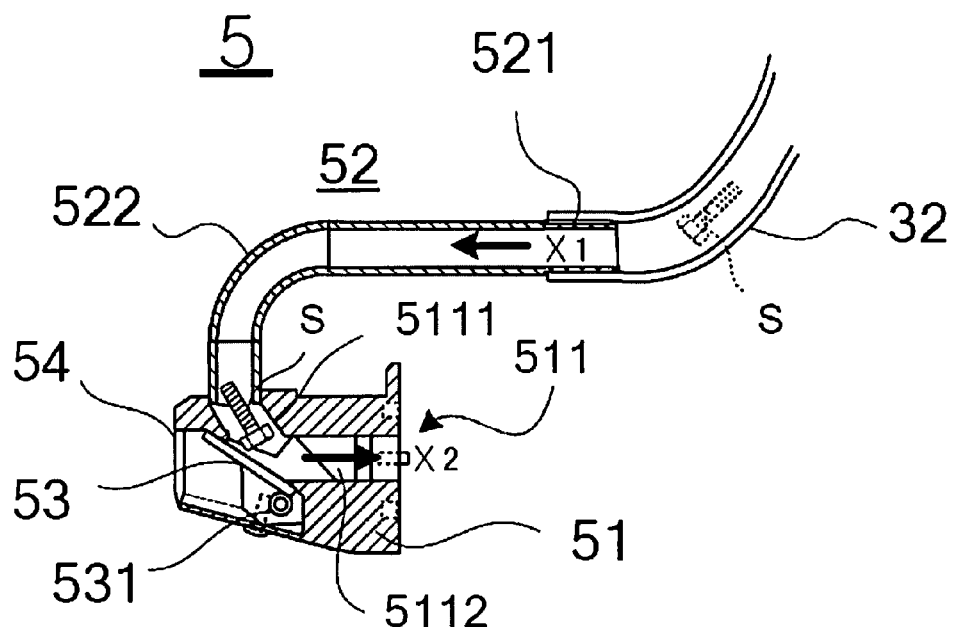
FIG. 10 is an enlarged cross-sectional view of a receiver unit 5 of FIG. 9.

As shown in FIG. 10, a receiver block 51 of the receiver unit 5 is disposed at a fore end of an intermediate cylindrical outer frame 60 of the screw tightening mechanism 4. A screw introduction tube 52 is provided to protrude toward a side of the fore end part of the receiver block 51. A connection part 521 to be connected to the transfer tube 32 is provided in the fore end of the screw introduction tube 52. An L-shaped curved part 522 is provided in the middle of the screw introduction tube 52. According to the shape and length of used screws, the inner diameter of the tube, the surface status of the inner wall, or the curvature of the curved part 522 of the screw introduction tube 52 may change to an optimal value for each kind of screws.

The receiver block 51 includes an inclined bifurcated guide path 511. On one side of the inclined bifurcated guide path 511, an inclined guide path 5111 is provided to be connected to the tube path of the screw introduction tube 52, coincide with the axis line of the screw tightening mechanism 4, and allow the screw head part S1 to meet the fore-end part 612 of the bit 61.

On the other part of the bifurcated guide path 511, a straight advance guide path 5112 is provided to allow the screw S whose the screw head part S1 is in engagement with the fore end of the bit to project to the outside of the receiver block 51.

Further, as shown in FIG. 10, a shutter 53 with a spring 531 is provided on the way to a fore-end opening part 54 of the straight advance guide path 5112 to be opened by a pressing force only when a screw projects. When a screw S is introduced from the transfer tube 32, the shutter 53 serves as a wall and a vacuum seal for maintaining an air suction force in the inner part of the straight advance guide path 5112.

[Cylinder Unit 6]

Figure 9:
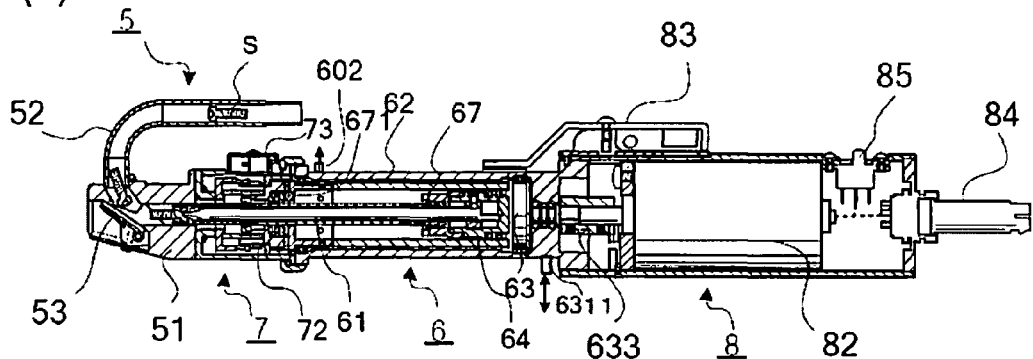
FIG. 9 is a cross-sectional view illustrating (a) a state in which a screw is engaged with a bit of FIG. 7 and (b) a state in which a screw tightening operation is performed.
Figure 9:
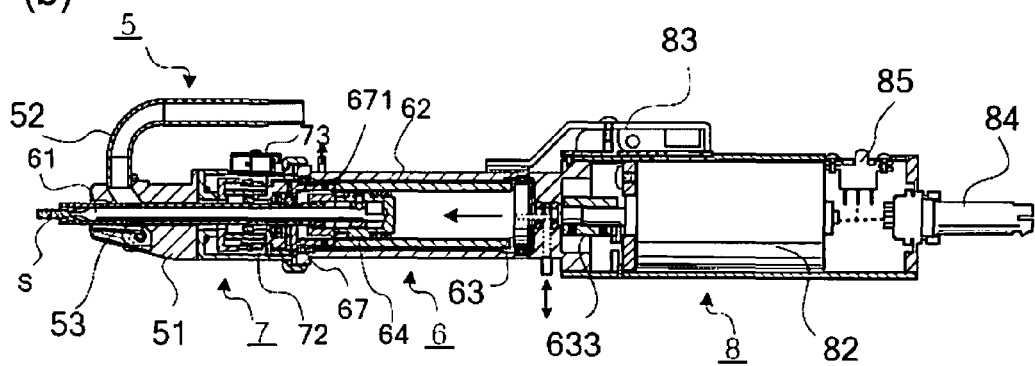

In an upper part of the receiver unit 5, as shown in FIG. 9, a cylinder housing 62 of the cylinder unit 6 for making the bit 61 advance and retreat is provided in the intermediate cylindrical outer frame 60.

Figure 11:
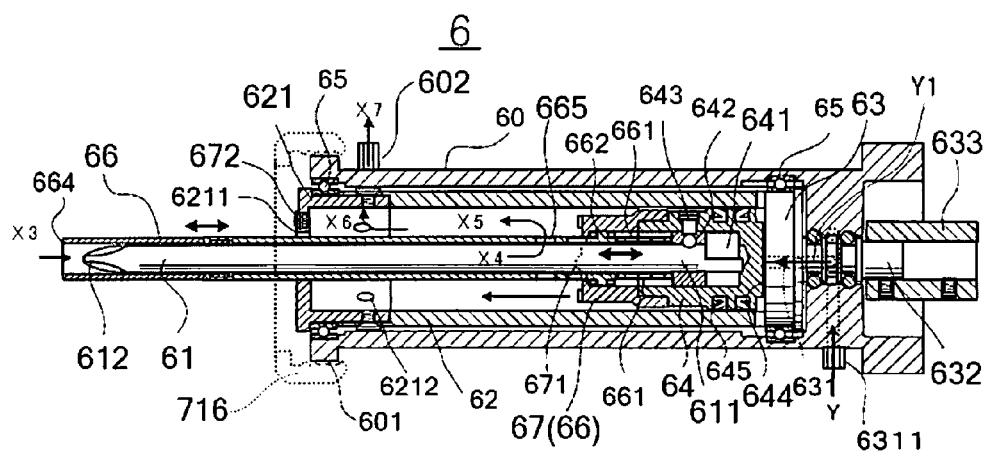
FIG. 11 is an enlarged cross-sectional view of a cylinder unit 6 of FIG. 9.

As shown in FIG. 11, a disk base unit 63 is air tightly fixed on one end side of the cylinder housing 62. A piston 64 is provided in the cylinder housing 62 to move in the left and right directions of FIG. 11 by an air pressure. To this end, a piston seal packing 645 is provided on the outer circumference of the piston 64 in order for air tightness.

On the bit 61 side of the piston 64, a detent block 641 into which a rear end part 611, having a semicircular cross section, of the bit 61 is fit is fixed. At the front of the detent block 641, a retaining ball 642 to hold the bit 61 and a ball holder 643 to hold the retaining ball are provided. Therefore, replacement of various kinds of bits 61 is very easy.

Compressed air or suction is introduced between a bottom part 644 of the piston 64 and a disk base unit 63 through an air introduction/discharge part 631 provided in the disk base unit 63 such that the piston 64 is driven to move in the left and right directions of FIG. 11.

The cylinder housing 62 and the disk base unit 63 are rotatably supported with respect to the intermediate cylindrical outer frame 60 by a plurality of bearings 65, a coupling 633 to be connected to a DC motor 82 for driving a rotation transmission part 632 is connected to a bottom part of the disk base unit 63, and the bit 61 and the cylinder housing 62 become one body and rotate during a screw tightening operation.

At the bit 61 provided to the piston 64 by the retaining ball 642, a cylindrical screw holder 66 is supported by a spring to be capable of slightly moving to the left and right directions of FIG. 11. A circumferentially convex part 662 is provided on the circumference of a rear end part 611 of the screw holder 66, and a clutch plate 67, which also serves as a spring holder, is fittingly mounted to prevent the circumferentially convex part 662 from slipping out together with the spring 661.

The rotation of the cylinder housing 62 is transmitted to the clutch plate 67 of the piston 64 through a clutch ball 672. Since the cylinder housing 62 is normally fixed to the piston 64 by the clutch plate 67 and the clutch ball 672, the rotation of the cylinder housing 62 is transmitted to the piston 64 only when a clutch plate 67 is connected by the clutch ball 672.

That is, if the piston 64 advances by compressed air, the clutch ball 672 retained at a lid part 621, which also serves as a ball holder for a clutch, of the cylinder housing 62 is engaged with an inclined surface 6711 of a chevron convex part 671 provided in front of the clutch plate 67. As a result, at torque having a normal screw tightening level, the rotation of the cylinder housing 62 is transmitted to the piston 64.

At this time, the clutch ball 672 is in contact with the piston 64 side by predetermined pressing force of a torque adjusting (pressing) spring 724 which is a pressing spring of a torque adjusting unit 7 as described below, and the pressing force of the torque adjusting (pressing) spring 724 of the torque adjusting unit 7 is stronger than the normal screw tightening torque. Therefore, the clutch ball 672 is engaged with the convex part 671 such that the rotation of the cylinder housing 62 is transmitted to the piston 64. If excessively high torque is applied to the bit 61 and the piston 64, the clutch ball 672 raises the inclined surface 6711 of the chevron convex part 671 and moves to the position of the clutch ball 672' in FIG. 13. As a result, the engagement of the clutch ball 672 is released, and the rotation of the piston 64 stops.

The screw holder 66 makes an air suction operation effective to ensure engagement of the screw head part S1 with the bit fore-end part 612, and has a function of holding a screw S even though the screw tightening mechanism 4 moves according to an operation. Further, when a screw S is tightened to a screwed subject part, since the screw holder 66 retreats against the pressure force of the spring 661 by the screwed subject part, the screw holder 66 does not cause any trouble in screwing work.

Here, the above-mentioned air suction path, in particular, an air suction path from the transfer tube 32 to the receiver unit 5 and the cylinder unit 6 will be described.

Air X1 sucked into the transfer tube 32 in FIG. 10 flows from X2 of the straight advance guide path 5112 of the receiver block 51 to X3 of the fore-end part 664 of the screw holder 66 of FIG. 11, passes through the gap between the screw S and the bit 61, and is discharged as X4 from an air opening 665, provided at the upstream of the clutch plate 67 which also serves as a spring holder, to a space X5 in front of the disk base unit 63 in the cylinder housing 62. Then, the air flows as X6 from an air opening 6212 provided on one side of the receiver of the front-side space X5 of the cylinder housing 62 to a gap between the outside of the cylinder housing 62 and the inside of the intermediate cylindrical outer frame 60, and then flows as X7 to a suction device (not shown) through a suction tube through a suction connection opening 602 provided in the intermediate cylindrical outer frame 60. At this time, the front-side space X5 of the cylinder housing 62 has a negative pressure, and, when the air pressure Y1 acting on the piston 64 is a negative pressure, since the air pressure Y1 is greater side of a pressure Y1 is greater, there is no problem, and when the air pressure Y1 is a positive pressure, the negative pressure of the front-side space X5 acts in the same direction of the air pressure Y1. Further, the suction device at least needs to have a strong suction power to retain the engagement of a screw with the fore-end part 612 of the driver bit 61.

[Torque Adjusting Unit 7]

Figure 8:
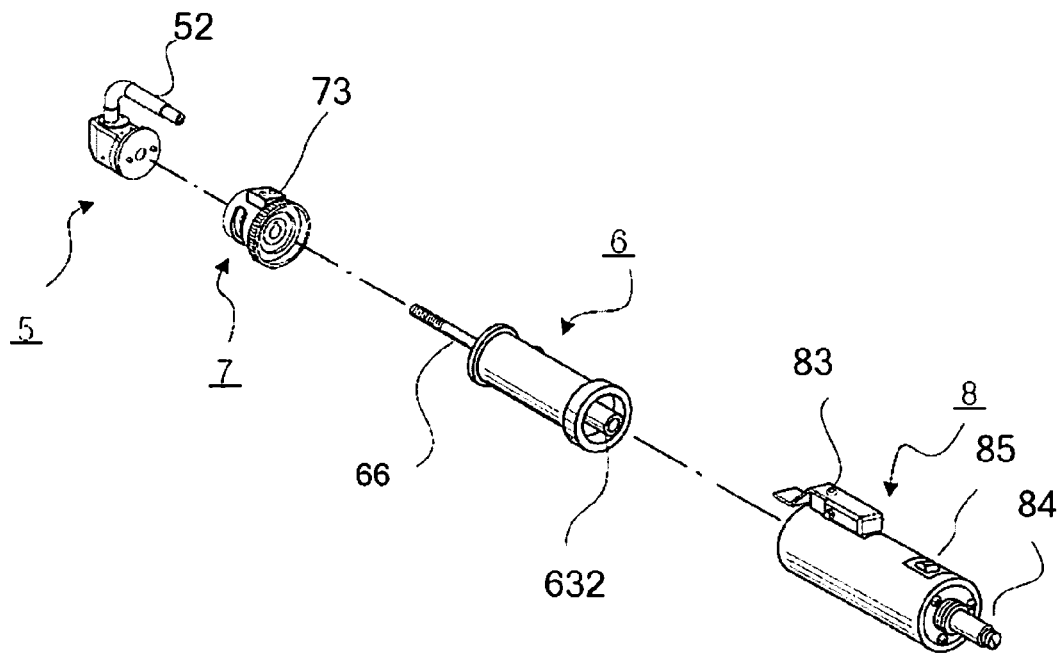
FIG. 8 is an exploded perspective view of the screw tightening mechanism.

FIG. 8 is an exploded perspective view of the whole screw tightening mechanism 4, and as shown in FIG. 8, the torque adjusting unit 7 is provided between the receiver unit 5 at the fore-end and the cylinder unit 6 so as to prevent an excessively high torque from being applied to the bit 61.

Figure 12:
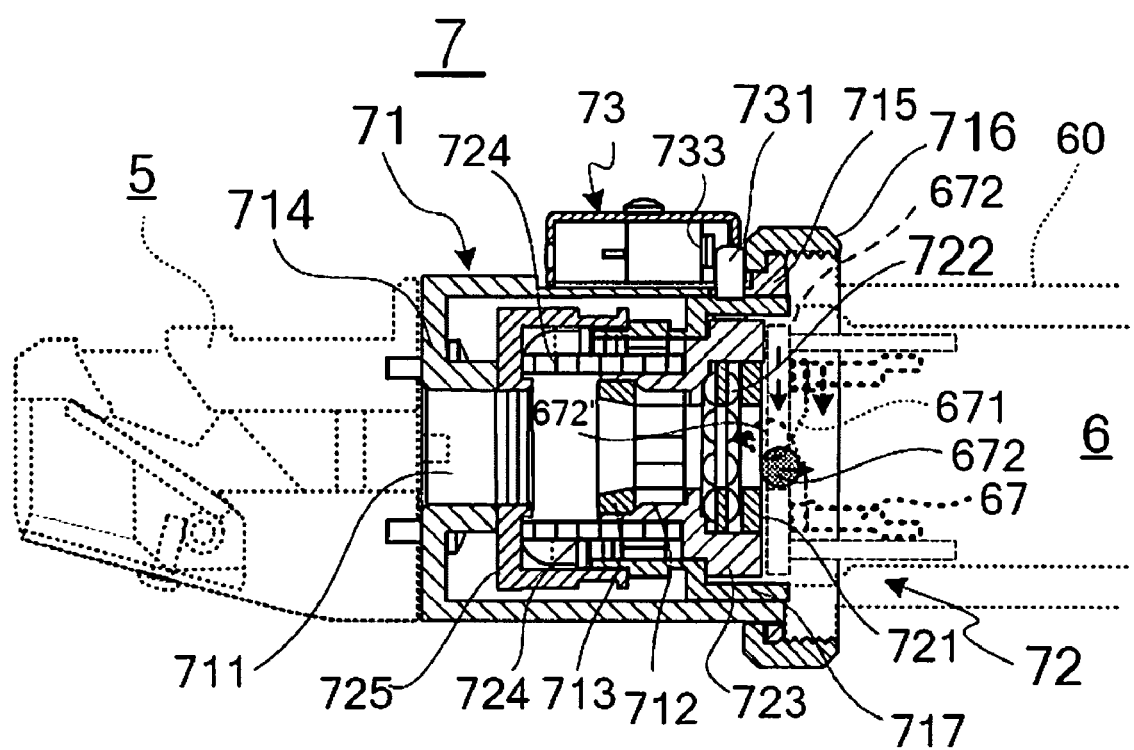
FIG. 12 is an enlarged cross-sectional view of a torque adjusting unit 7 of FIG. 9
Figure 13:
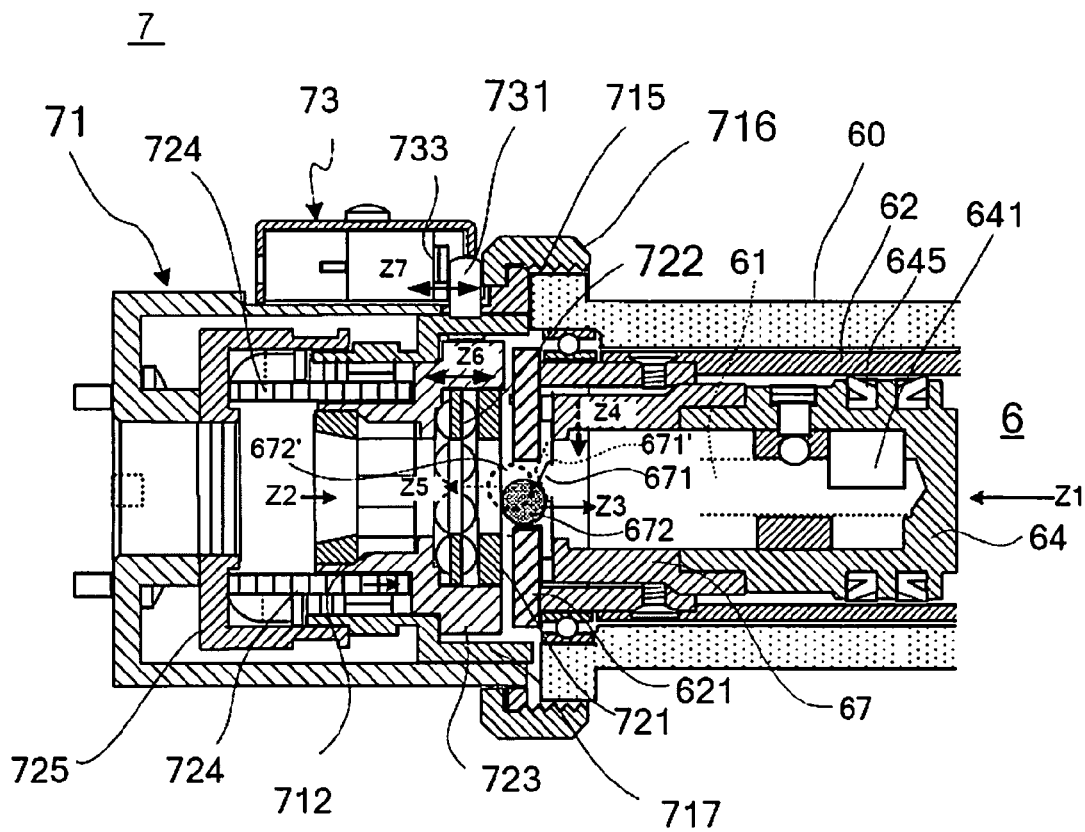
FIG. 13 is an enlarged cross-sectional view illustrating a clutch operation of the cylinder unit 6 and the torque adjusting unit 7.

Since the torque adjusting unit 7 is the same as shown in FIGS. 12 and 13, as described above, in general, the piston 64 and the clutch ball 672 retained in a ball retaining hole 6211 provided in the lid part 621 which also serves as a ball holder are pressed with a predetermined pressing force Z1 by compressed air Y, and the torque adjusting (press) spring 724 presses the clutch ball 672 in reverse directions Z2 and Z3 to be engaged with the inclined surface 6711 of the chevron convex part 671, thereby transmitting rotation. Further, when a predetermined or greater torque is applied to the bit 61 and the piston 64, in order to protect a '+' or '−' shaped engagement groove of a head part of a screw or a female thread part of a subject part from damage, the chevron convex part 671 tries to rotate the piston 64 (in a direction Z4) with an excessively high torque, and the clutch ball 672' gets over the top of the chevron convex part 671' and moves to a position Z5 where engagement is released. That is, the clutch ball 672 is evacuated toward the torque adjusting unit 7 and the pressing force of the torque adjusting unit 7 is adjusted to idle the cylinder housing 62.

[Frame Body Part 71]

The torque adjusting unit 7 generally includes a frame body part 71, a pressing-force adjusting unit 72, and a limit sensor unit 73. In the central region of the frame body part 71, a middle cylindrical space part 711 for holding the screw holder 66 is provided. In the middle cylindrical space part 711, a screw-holder rotation preventing block 712 for preventing rotation of the screw holder 66 is provided. On the front surface of the screw-holder rotation preventing block 712, a vacuum seal member 713 is disposed.

In the front surface part of the frame body part 71, a connector 714 for connecting and fixing the receiver unit 5 is provided to fix the receiver unit 5. It the rear surface part of the frame body part 71, a circular rim 715 connecting and fixing an engagement part 601 provided at a front-surface peripheral part of the intermediate cylindrical outer frame 60 of the cylinder unit 6, and a lid part 716 for being screwed shut on the engagement part 601 are provided. The lid part 716 is screwed to engage with the engagement part 601, thereby fixing the cylinder unit 6.

[Pressing-force Adjusting Unit 72]

The pressing-force adjusting unit 72 is held in an adjustment box 717 of the frame body part 71, and a thrust bearing 722 is held in a bearing holder 723 capable of moving left and right (see a reference symbol 'Z6' of FIG. 13) so that a washer 721 being in direct contact with the clutch ball 672 can freely rotate.

The opposite side of the thrust bearing 722 to the washer 721 is disposed to be in contact with one end of the bearing holder 723, and be pressed by one end of a torque adjusting (pressing) spring 724.

Meanwhile, on the fore end side (receiver unit 5 side) of the adjustment box 717, a torque adjusting cup 725 is fit by a screw so that the fitting level can be adjusted. The inner wall of the torque adjusting cup 725 is in contact with and pressed by the other end of the above-mentioned torque adjusting spring 724.

Therefore, by adjusting the torque adjusting cup 725, the spring press of the torque adjusting spring 724 can be adjusted and the pressing force to the thrust bearing 722, the washer 721, and the clutch ball 672 can be adjusted. As a result, if an excessively high torque occurs at the bit 61, a rotation force with an excessively high torque works on the clutch plate 67 of the piston 64, and the clutch ball 672 normally engaging with the convex part 617 of the clutch plate 67 releases the gradually rising engagement against the pressing force Z2 of the torque adjusting spring 724 such that skidding is caused between the clutch plate 67 and the clutch ball 672, whereby the cylinder housing 62 engaging with the clutch ball 672 is released from the engagement and runs idle.

[Limit Sensor Unit 73]

The limit sensor unit 73 is a mechanism that makes the cylinder housing 62 idle, and at the same time, powers off a drive motor 15 rotating the cylinder housing 62 when a load equal to or greater than a predetermined torque is applied to the bit 61.

As described above, as shown in FIGS. 12 and 13, if an excessively high torque occurs at the bit 61, the clutch ball 672 retreats to the fore end side Z5 against the pressing force Z2 of the torque adjusting spring 724. As a result, a Bella holder 423 also retreats (to the left side of FIG. 12). At a part of the outer circumference of the Bella holder 423, a dog 731 extending to the outer circumference through a long hole 718 of the frame body part 71 is fixed, and at a position Z6 corresponding to the dog 731 moving left and right according to a variation of torque, a switch unit 733 of the limit sensor unit 73 is disposed. The switch unit 733 of the limit sensor 73 is connected to the drive motor 15 rotating the cylinder housing 62 and is pressed to power off a drive DC motor 82 when the dog 731 moves to a position where the clutch is cut off due to an excessively high torque (see a reference symbol 'Z7' of FIG. 13).

[Motor Drive Unit 8]

Figure 14:
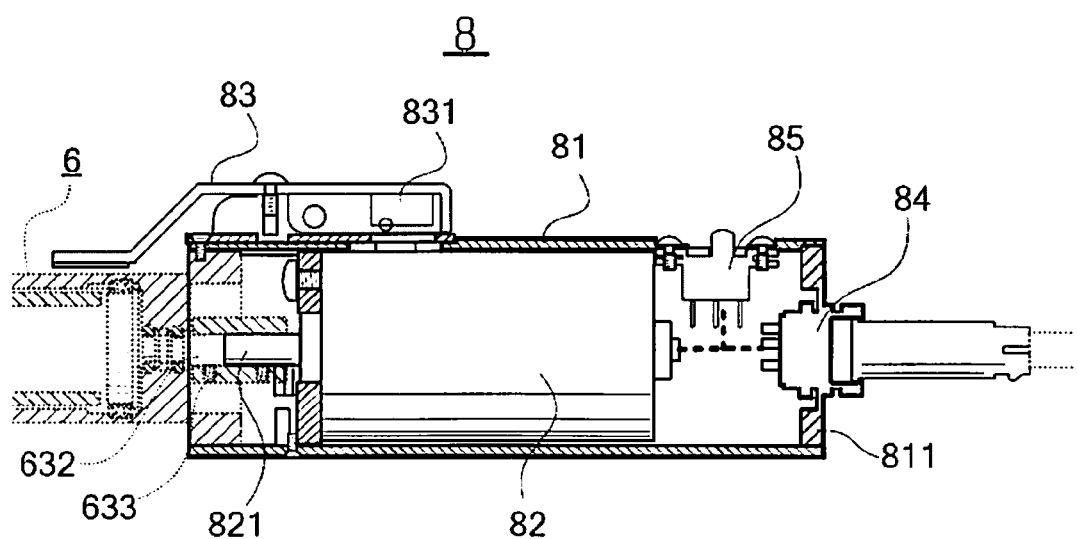
FIG. 14 is an enlarged cross-sectional view of a motor drive unit 8 of FIG. 9.

As shown in FIGS. 7 to 9, the motor drive unit 8 is attached to the cylinder unit 6. As shown in FIG. 14, in the motor drive unit 8, a DC (direct current) motor 82 is held in a cylindrical outer frame 81 which also serves as a gripper for a user, a motor rotating lever 83 is disposed at a part of the outer circumference of the side surface of the cylindrical outer frame 81, and a connector 84 connecting a connector cable for a power supply or a signal is disposed at a frame rear-end part 811. The power supply from the connector 84 can be selected by a changing-over switch for switching the rotation direction of the DC motor 82 to a clockwise direction or a counter-clockwise direction. That is, a direction for tightening a screw with the bit 61 or a direction for loosening and unscrewing a screw is selected.

A spindle of the rotation transmission part 632 of the disk base unit 63 of the cylinder housing 62 is connected to an output shaft of the DC motor 82 by a coupling 633. When power is supplied to the DC motor 82, the cylinder housing 62 also rotates as one body with the spindle of the rotation transmission part 632.

Further, when the motor rotating lever 83 is pushed down, a motor rotating switch 831 is pressed and power is supplied to rotate the motor. If the motor rotating lever 83 is released, power is shut off to stop the motor. As described above, the DC motor 82 is similarly controlled by the limit sensor unit 73 in addition to the motor rotating lever 83.

[Operation]

Figure 15:
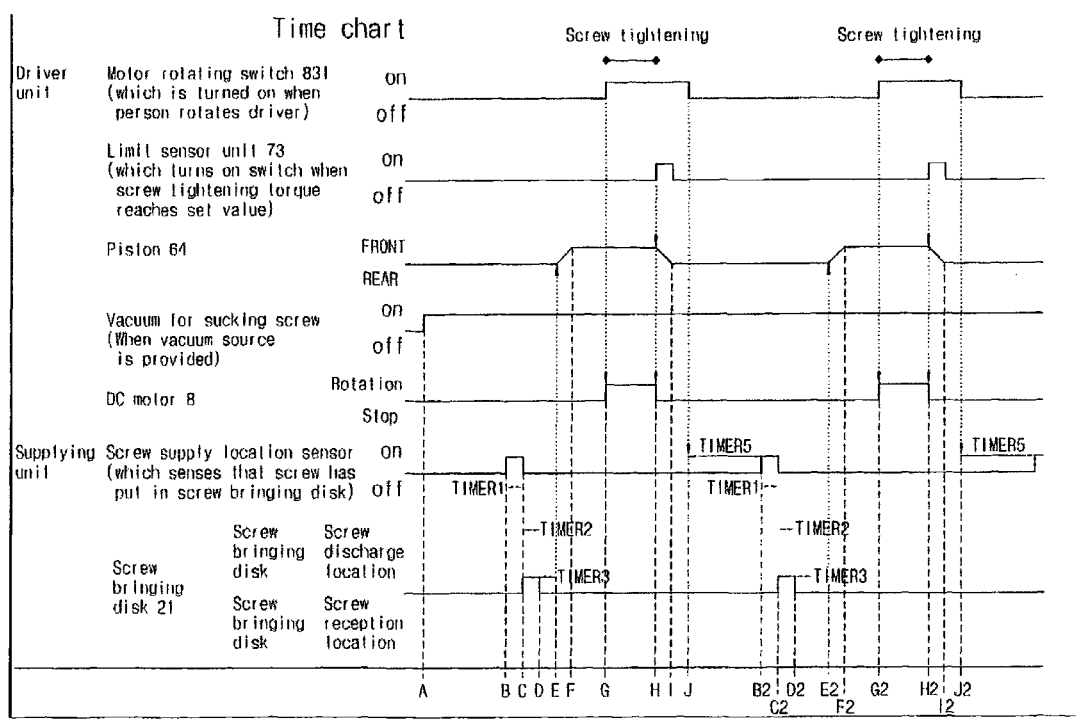
FIG. 15 is a time chart of an embodiment of the present invention.
Figure 16:
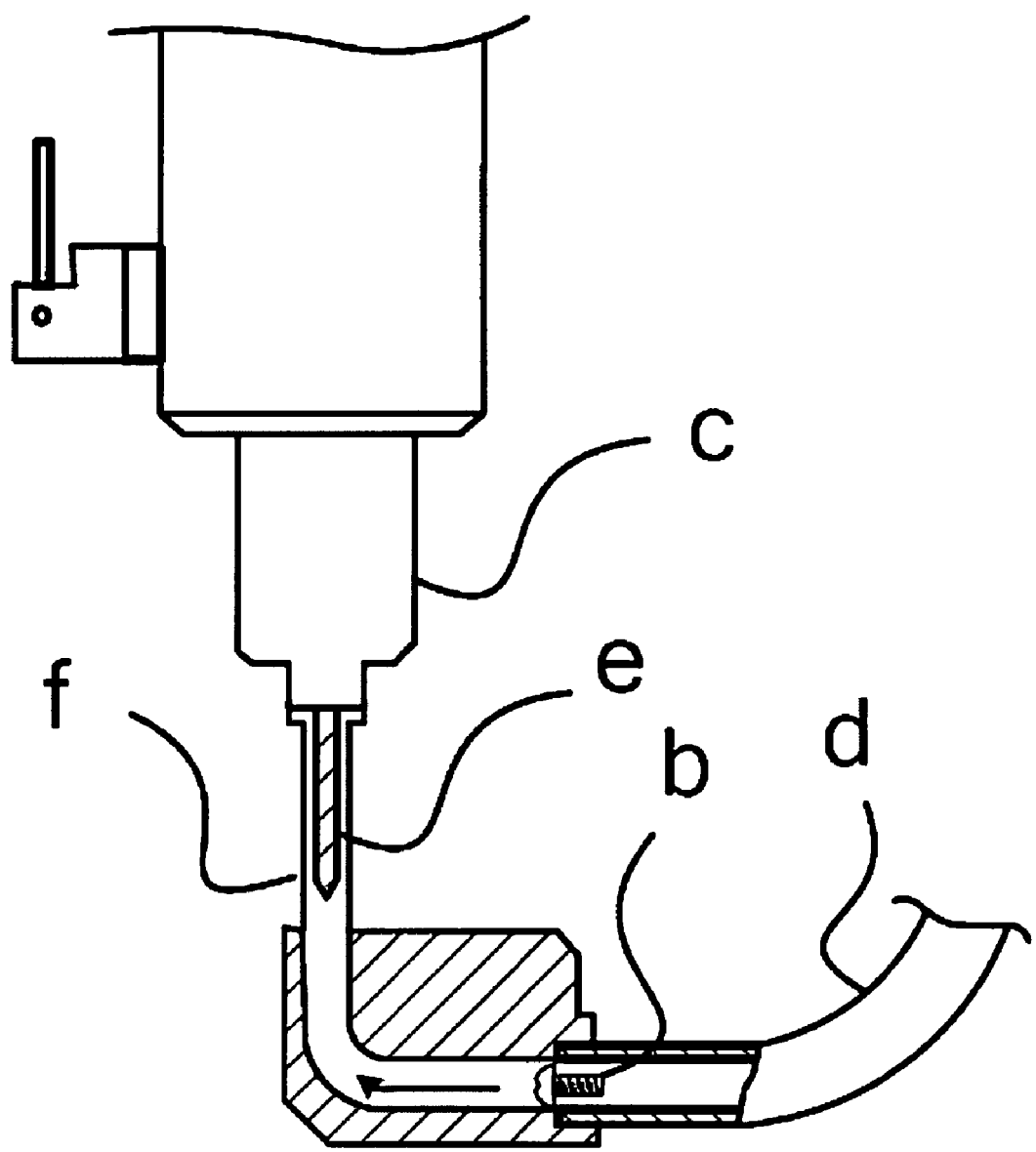
FIG. 16 is a cross-sectional view of an automatic screw tightening apparatus according to the related art.

A screw tightening operation of an embodiment of the present invention will be described with reference to the screw supplying mechanism 1 of (a) to (d) of FIG. 6, the configuration of the automatic screw tightening apparatus of the screw tightening mechanism 4 of (a) and (b) of FIG. 9, and the sequence of a time chart shown in FIG. 15.

First, if an automatic screw tightening operation starts, at a time point 'A' of the time chart of FIG. 15, suction (hereinafter, referred to as normal suction) is performed from the suction inlet 602 connected to a vacuum source, and a screw S is normally sucked in the transfer tube 32 and is transferred to the front of the bit 61, thereby making preparations.

Next, at a time point 'B', a screw supply location (existence or nonexistence) sensor 16 at a fore end of the alignment screw guide 122 of the screw supplying mechanism 1 senses that the screw S has been put. At a time point 'C', the screw discharging unit 2 is operated to supply the screw S to the screw receiving groove 213 of the screw transfer mechanism 3.

At a time point 'D', as shown in (b) and (c) of FIG. 6, the screw bringing disk 21 rotates clockwise, and as shown in (d) of FIG. 6, the screw S is introduced from the screw discharging unit 2 to the transfer tube 32 of the screw transfer mechanism 3 so that the screw is transferred with the screw head part S1 being in the lead. Then, the screw head part S1 of the screw S transferred from the transfer tube 32 is firmly engaged with and held at the fore-end part 612 of the drive bit 61 of the screw tightening mechanism 4 by a sucking action from the suction inlet 602.

At a time point 'E', compressed air is introduced from an air introducing/discharging opening 6311 of the cylinder unit 6 and the piston 64 advances.

At a time point 'F', the piston 64 transitions from the state of (a) of FIG. 9 to the state of (b) of FIG. 9. That is, the clutch plate 67 is joined to the clutch ball 672 such that preparations for tightening the screw are completed and the bit 61 stands by for rotating. At this time, the shutter (sealing cover) 53, which is provided in the fore-end part of the receiver unit 5 of the screw tightening mechanism 4 and is openable and closable, is opened when the fore end of bit (driver) 61 moves straight. Then, the screw S engaged with the bit 61 is exposed to the outside of the receiver unit 5 while being held in the screw holder 66, and stands by.

All preparations for tightening the screw are completed and a worker presses the screw tightening mechanism 4 to the screwed subject part that is a work subject, thereby starting a screw tightening operation. Then, at a time point 'G', when the motor rotating lever 83 is pushed to power on the DC motor 82, the DC motor 82 stats to rotate.

At this time, when the user grasps the cylindrical outer frame 81, which is a handle, to gently press the cylindrical outer frame 81 downward, the cylinder housing 62 and the bit 61 rotate to tighten the screw S, ant at the same time, the piston 64 of the cylinder unit 6 is always subject to a downward pressing force by the compressed air Y introduced from the air introducing/discharging opening 6311.

During the screw tightening operation, when the limit sensor unit 73 of the torque adjusting unit 7 senses that a predetermined torque or greater is being applied to the bit 61 (the limit sensor unit 73 outputs a 'on' signal) at a time point 'H', the power supply to the DC motor 82 is shut off such that the rotation of the cylinder housing 62 stops, and at the same time, through the air introducing/discharging opening 6311, external air is sucked and the air inside of the cylinder housing 62 is discharged. Then, at a time point 'I', the piston 64 retreats so as to return to the original state. Next, at a time point 'J', the worker releases the motor rotating lever 83, thereby finishing the operation of tightening the screw S.

After it is detected that the motor rotating lever 83 has been released at the time point 'J', preparations for the next screw tightening operation is made. In particular, when the screw supply location (existence or nonexistence) sensor 16 of the fore end of the alignment screw guide 122 of the screw supplying mechanism 1 senses that there is a put screw S at a time point 'B2', the screw discharging unit 2 operates at a time point 'C2' to transfer the screw S to the screw receiving groove 213 of the screw tightening mechanism 4. Next, an operation of tightening the screw S from a time point 'D2' to a time point 'J2' of FIG. 15 is performed, and may be a repetition of the previous operation.

Here, transfer mechanisms for transferring screws with air according to the related art will be described in detail with reference to FIGS. 17 and 18 while contrasting disadvantages of pressure feed by compressed air with a suction device according to an embodiment of the present invention.

Figure 17:
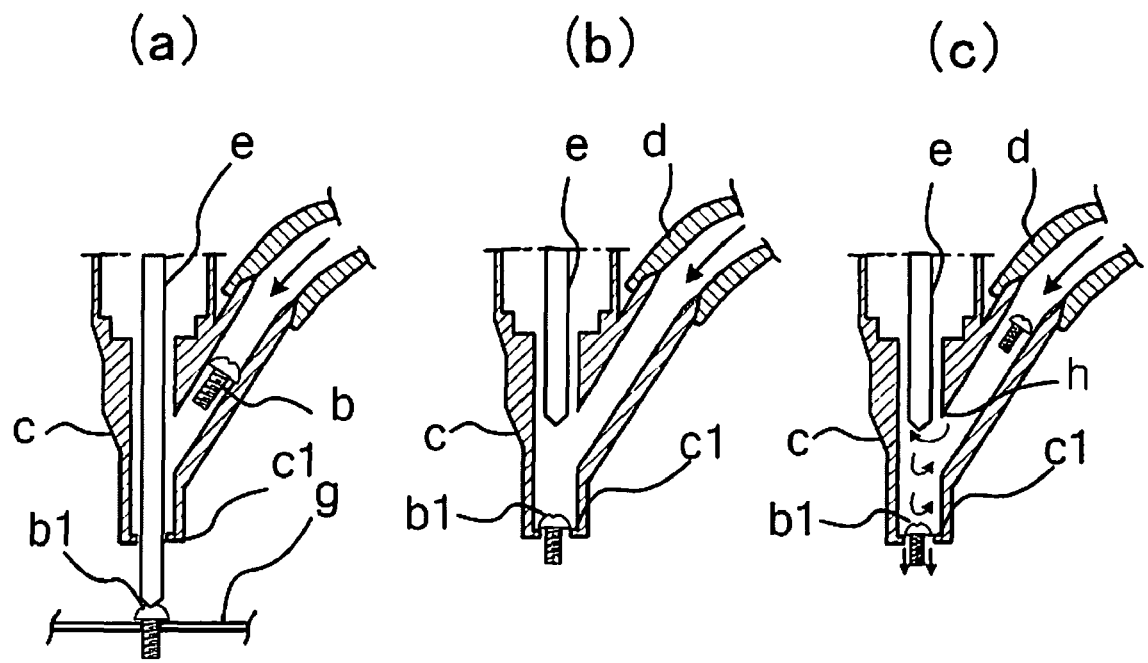
FIG. 17(a)-17(c) is a cross-sectional view of another automatic screw tightening apparatus according to the related art.

As can be seen from an air flow shown by arrows in (c) of FIG. 17, air for pressure feed causes vortex between a Y-shaped path h and a holder c1 of a fore-end part. As a result, the number of times screws are stuck or reversed increases. Specifically, all the air fed for pressure feed is not discharged from an outlet of a route but the flow of remaining air is reversed between the Y-shaped path h and the holder c1 so as to cause a vortex state. Therefore, a rotation force is applied to screws. For this reason, short screws and light screws may easily rotate.

Figure 18:
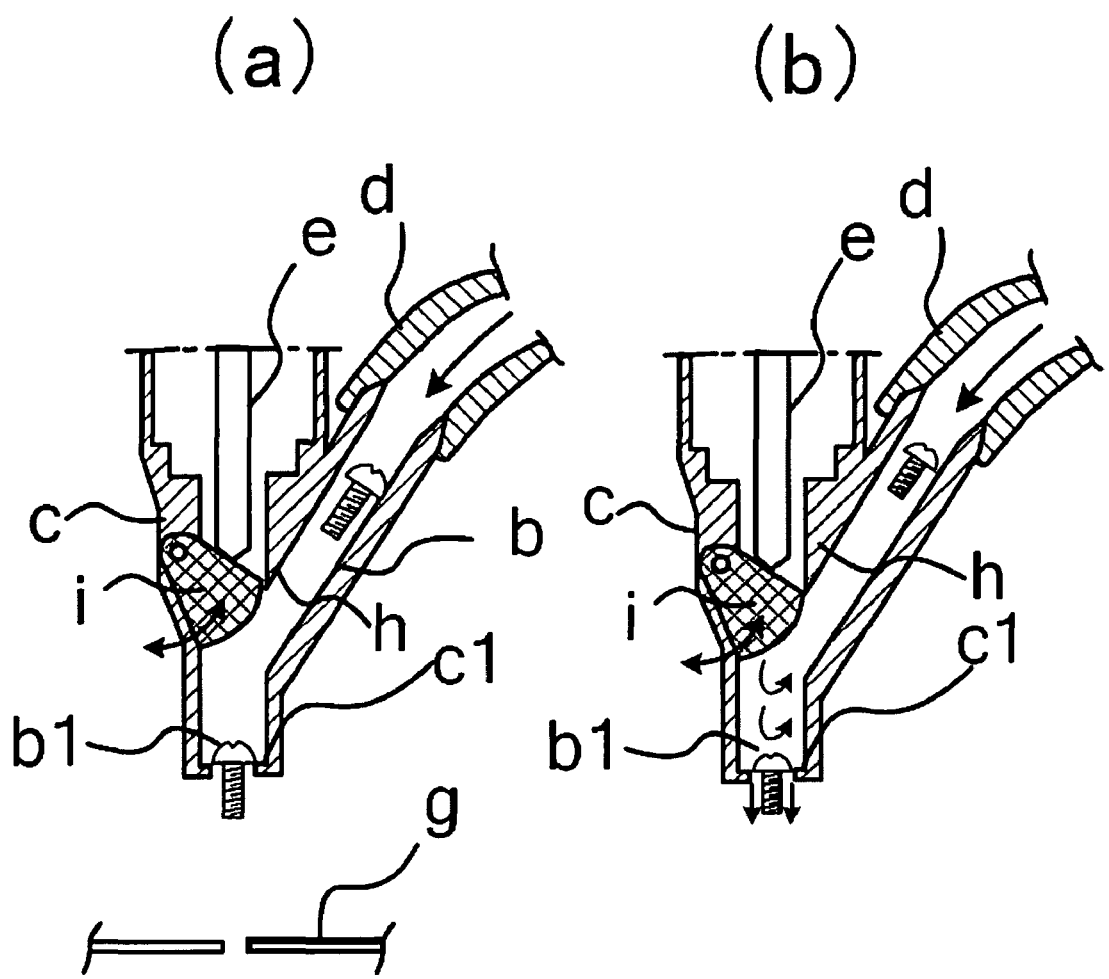
FIGS. 18(a) and 18(b) is a cross-sectional view of another automatic screw tightening apparatus according to the related art.

Further, as shown in (a) of FIG. 18, as one of method for preventing a screw from being reversed, there has been proposed a configuration in which a screw-reversal preventing mechanism i for preventing a screw reversal in the vicinity of a Y-shaped path h is attached. However, as shown in (b) of FIG. 18, in a screw supply driver unit having the above-mentioned configuration, in a case of a screw in which the length is about twice or more the diameter of the screw head and in a case of a large-sized screw (heavy screw), if each screw transfer tube has an appropriate inner diameter, stable supply is possible. However, in a case of a screw in which the length is about two or less that the diameter of the screw head or in a case of a small-sized screw (light screw), the probability in which the screw is sucked or reversed between the Y-shaped path h and a holder c1 remarkably increases.

Therefore, the embodiment of the present invention solves the vortex phenomenon of air occurring between the Y-shaped path h and the holder c1 by changing the screw transfer manner from pressure feed to suction.

First of all, in the case of pressure feed, as a method of suppressing a vertex, a method of adjusting an amount of air in order not to cause a vertex is exemplified. However, actually, since there are too many factors for adjustment, such as a variation in the sizes or shapes of individual screws or a variation in the temperatures or dew points of supplied air, it is very difficult to appropriately adjust the amount of air.

Meanwhile, when a screw is transferred by suction as in the embodiment of the present invention, an amount of air flowing into the driver is determined by an amount of discharged air of the suction device for suction, which means that no air remains. Therefore, a vertex state of air does not occur. As a result, it becomes possible to transfer a screw in a stable position.

Since the embodiment of the present invention has a configuration and an action as described above, it has the following advantages.

(1) Since the automatic screw tightening apparatus according to this embodiment automatically and sequentially supplies screws S to the fore-end part 612 of the bit (driver) 61, time until when screw tightening is completed is very short, it is unnecessary to move the screw tightening device (mechanism) whenever a screw is tightened to a screwed subject part, and screw tightening operations can be consecutively performed in the vicinity of the screwed subject part so as to simplify work.

(2) Since the screw transfer mechanism by air suction from the screw supplying mechanism side transfers a screw S with a screw head part S1 being in the lead, the screw is less likely to damage the inner wall of the transfer tube 32 and is not stuck in the transfer tube 32, and it is possible to firmly engage the screw S with the fore-end part 612 of the (driver) bit 61 and to stably supply the screw, thereby capable of improving the reliability.

(3) Since the stretchable screw holder 66 is provided in the axis direction of the bit 61 and air is always sucked toward the base of the bit 61, the screw S does not fall off the fore-end part 612 of the bit 61 and opening and closing of the shutter (sealing cover) is reliably performed.

(4) Since the operation of the screw discharging unit 2 of the screw supplying mechanism 1 is performed under a command of the driver operating switch at a stage in which a preceding screw tightening operation is completed, it is possible to transfer the next screw S to the fore-end part 612 of the bit 61 of the screw tightening mechanism 4 and keep the next screw S at the fore-end part 612, thereby capable of consecutive operations and a reduction in operation time.

(5) The cylinder housing 62 and the bit 61 rotate to tighten a screw S only by holding the cylindrical outer frame 81, which is a handle, to gently press the cylindrical outer frame downward, and if necessary, the piston 64 of the cylinder unit 6 also generates the suction force of the screw tightening mechanism side by compressed air introduced from the air introduction/discharge part 6311, whereby a downward pressing force is always applied. Therefore, it is possible to perform a screw tightening operation at a predetermined location.

It will be apparent to those skilled in the art that various modifications and changes may be made without departing from the scope and spirit of the invention. Therefore, it should be understood that the above embodiment is not limitative, but illustrative in all aspects. The scope of the invention is defined by the appended claims rather than by the description preceding them, and therefore all changes and modifications that fall within metes and bounds of the claims, or equivalents of such metes and bounds are therefore intended to be embraced by the claims.

What is claimed is:

1. An automatic screw tightening apparatus that transfers a screw from a screw supplying mechanism to a screw tightening mechanism by a screw transfer mechanism using air suction of the screw tightening mechanism and tightens the screw to a predetermined screwed subject part, wherein:
 a screw discharging unit for transferring the screw to a transfer tube with the head part of the screw being in the lead is provided in the screw supplying mechanism,
 an engaging unit for engaging the head part of the screw transferred from the transfer tube with a fore end of a driver is provided in a fore-end part of the screw tightening mechanism, and
 an openable and closable sealing cover for preventing air from leaking is provided in the fore-end part of the screw tightening mechanism, and is opened and exposes the screw engaged with the fore end of the driver when the fore end of the driver moves straight, whereby screw tightening is performed.

2. The automatic screw tightening apparatus according to claim 1, wherein:
 a cylindrical screw holder covering the driver and the screw is provided, pushes the sealing cover to open the sealing cover when the driver advances while maintaining the engagement state of the screw, and retreats when the screw is pressed against the screwed subject part.

3. The automatic screw tightening apparatus according to claim 2, wherein:
 the screw discharging unit of the screw supplying mechanism is operated by a command of a driver operating switch.

4. The automatic screw tightening apparatus according to claim 1, wherein:
 the screw discharging unit of the screw supplying mechanism is operated by a command of a driver operating switch.

* * * * *